United States Patent
Komura (10) Patent No.: US 11,186,247 B2
(45) Date of Patent: Nov. 30, 2021

(54) VEHICLE CURTAIN AIRBAG DEVICE

(71) Applicant: Toyota Jidosha Kabushiki Kaisha, Toyota (JP)

(72) Inventor: Takamichi Komura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 68 days.

(21) Appl. No.: 16/667,090

(22) Filed: Oct. 29, 2019

(65) Prior Publication Data
US 2020/0139922 A1 May 7, 2020

(30) Foreign Application Priority Data

Nov. 6, 2018 (JP) .............................. JP2018-209056

(51) Int. Cl.
| | | |
|---|---|---|
| *B60R 21/232* | (2011.01) | |
| *B60R 21/213* | (2011.01) | |
| *B60R 21/233* | (2006.01) | |
| *B60R 21/2346* | (2011.01) | |
| *B60R 21/2342* | (2011.01) | |
| *B60R 21/261* | (2011.01) | |

(52) U.S. Cl.
CPC .......... *B60R 21/232* (2013.01); *B60R 21/213* (2013.01); *B60R 21/233* (2013.01); *B60R 21/2342* (2013.01); *B60R 21/2346* (2013.01); *B60R 2021/23324* (2013.01); *B60R 2021/2612* (2013.01)

(58) Field of Classification Search
CPC ... B60R 21/213; B60R 21/232; B60R 21/233; B60R 21/2342; B60R 21/2346; B60R 2021/23324; B60R 2021/26094; B60R 2021/2612
See application file for complete search history.

(56) References Cited

U.S. PATENT DOCUMENTS

| | | | | |
|---|---|---|---|---|
| 6,135,493 | A * | 10/2000 | Jost ...................... | B60R 21/232 |
| | | | | 280/730.2 |
| 6,152,481 | A * | 11/2000 | Webber ............... | B60R 21/2338 |
| | | | | 280/730.2 |
| 6,213,499 | B1 * | 4/2001 | Khoudari .............. | B60R 21/232 |
| | | | | 280/729 |
| 6,530,595 | B2 * | 3/2003 | Masuda ................ | B60R 21/232 |
| | | | | 280/729 |
| 7,549,669 | B2 * | 6/2009 | Keshavaraj .......... | B60R 21/232 |
| | | | | 280/729 |
| 7,556,288 | B2 * | 7/2009 | Zauritz ................. | B60R 21/232 |
| | | | | 280/729 |

(Continued)

FOREIGN PATENT DOCUMENTS

| | | |
|---|---|---|
| JP | 2003-320920 A | 11/2003 |
| JP | 2008-056242 A | 3/2008 |

(Continued)

*Primary Examiner* — Laura Freedman
(74) *Attorney, Agent, or Firm* — Dinsmore & Shohl LLP (57) ABSTRACT

A control valve provided in a communicating portion restricts the supply of gas from a front main chamber to a rear delay chamber during an initial stage of inflation and deployment of the front main chamber. The control valve releases restriction of the supply of the gas from the front main chamber to the rear delay chamber during the later stage of inflation and deployment of the front main chamber.

17 Claims, 7 Drawing Sheets

(56) References Cited

U.S. PATENT DOCUMENTS

| | | | | |
|---|---|---|---|---|
| 7,770,917 | B2* | 8/2010 | Henderson | B60R 21/239 280/730.2 |
| 8,668,224 | B2* | 3/2014 | Taniguchi | B60R 21/239 280/729 |
| 8,727,376 | B2* | 5/2014 | Goto | B60R 21/232 280/730.2 |
| 9,321,425 | B2* | 4/2016 | Charpentier | B60R 21/233 |
| 2009/0218798 | A1* | 9/2009 | Garner | B60R 21/232 280/742 |
| 2014/0210192 | A1 | 7/2014 | Hotta et al. | |
| 2016/0031402 | A1 | 2/2016 | Ohno et al. | |

FOREIGN PATENT DOCUMENTS

| | | |
|---|---|---|
| JP | 2010-143528 A | 7/2010 |
| JP | 2011-255714 A | 12/2011 |
| JP | 2016-055824 A | 4/2016 |
| WO | 2015/029972 A1 | 3/2015 |

\* cited by examiner

VEHICLE CURTAIN AIRBAG DEVICE

CROSS-REFERENCE TO RELATED APPLICATION

This application is based on and claims priority under 35 USC 119 from Japanese Patent Application No. 2018-209056, filed on Nov. 6, 2018, the disclosure of which is incorporated by reference herein.

BACKGROUND

Technical Field

The present disclosure relates to a vehicle curtain airbag device.

Related Art

Japanese Patent Application Laid-open (JP-A) No. 2010-143528, for example, discloses a technology relating to a vehicle curtain airbag device. The vehicle curtain airbag device has a main chamber, which is connected to a communicating portion that supplies gas from an inflator, and a check valve, which is provided inside the communicating portion. The check valve restricts the flow of the gas from the main chamber to the inflator. Consequently, when the main chamber restrains the head of an occupant, the gas in the main chamber can be prevented from backflowing to the inflator, thereby maintaining the internal pressure of the main chamber as designed.

It is conceivable to increase the size of the curtain airbag to further improve its occupant restraint performance, but when the size of the curtain airbag is increased, it becomes more difficult for the internal pressure of the curtain airbag to rise in a short amount of time. In particular, a curtain airbag is integrally configured with not only a main chamber that is needed for initial restraint of the occupant's head but also an area that becomes needed in the later stage of impact, such as a delay chamber. Consequently, when the size of the curtain airbag is increased, there is the potential for the gas to flow also to the delay chamber or the like in the initial state of an impact to the vehicle so that it becomes difficult for the internal pressure of the main chamber to rise, thereby affecting the curtain airbag's ability to restrain the occupant's head. Consequently, the technology disclosed in JP-A No. 2010-143528 has room for improvement in this respect.

SUMMARY

The present disclosure obtains a vehicle curtain airbag device that can raise the internal pressure of the main chamber early on during the initial state of inflation and deployment.

A vehicle curtain airbag device pertaining to a first aspect includes a main chamber that is inflated and deployed in a vehicle downward direction from a vehicle width direction outer end portion of a ceiling as a result of an inflator being activated and gas being supplied to an interior of the main chamber at a time of a vehicle impact, a delay chamber that is provided at at least one side of the main chamber in the vehicle front-rear direction and is inflated and deployed by the gas supplied from the main chamber via a communicating portion, and a gas flow control portion that is provided in the communicating portion, restricts the supply of the gas from the main chamber to the delay chamber during the initial stage of the inflation and deployment of the main chamber, and releases restriction of the supply of the gas from the main chamber to the delay chamber during the later stage of the inflation and deployment of the main chamber.

According to the first aspect, the vehicle curtain airbag device has the main chamber, the delay chamber, and the gas flow control portion. The main chamber is inflated and deployed in the vehicle downward direction from the vehicle width direction outer end portion of the ceiling as a result of the inflator being activated and the gas being supplied to the interior of the main chamber at the time of the vehicle impact. The delay chamber is provided at at least one side of the main chamber in the vehicle front-rear direction and is inflated and deployed by the gas supplied from the main chamber via the communicating portion. The gas flow control portion is provided in the communicating portion and restricts the supply of the gas from the main chamber to the delay chamber during the initial stage of the inflation and deployment of the main chamber. The gas flow control portion releases restriction of the supply of the gas from the main chamber to the delay chamber during the later stage of the inflation and deployment of the main chamber. Consequently, during the initial stage of the inflation and deployment of the main chamber the supply of the gas from the main chamber to the delay chamber is restricted, so the gas stays in the main chamber and the internal pressure of the main chamber can be raised early on. For this reason, the head of the occupant that needs to be restrained during the initial stage of an impact to the vehicle can be efficiently restrained by the main chamber. Furthermore, during the later stage of the inflation and deployment of the main chamber the gas is supplied from the main chamber to the delay chamber, so the entire curtain airbag, including also the delay chamber that is not needed for occupant restraint during the initial stage of an impact to the vehicle, can be inflated and deployed.

A vehicle curtain airbag device pertaining to a second aspect is the first aspect, wherein the gas flow control portion is configured by a control valve in which part of a flow passage through which the gas flows is sewn by tear seams that tear when they receive inflation and deployment pressure of the main chamber during the later stage of inflation and deployment.

According to the second aspect, the gas flow control portion is configured by a control valve. In this control valve, part of the flow passage through which the gas flows is sewn by the tear seams that tear when they receive the inflation and deployment pressure of the main chamber during the later stage of inflation and deployment. Consequently, during the initial stage of inflation and deployment the main chamber is filled with the gas from the inflator, and during the later stage of inflation and deployment the tear seams tear and the gas flows from the main chamber to the delay chamber. For this reason, during the initial stage of inflation and deployment the internal pressure of the main chamber can be raised early on. Furthermore, the tear timing of the tear seams can be adjusted by changing the thread strength and sewing length of the tear seams, so the difference in the inflation times of the main chamber and the delay chamber can be easily changed.

A vehicle curtain airbag device pertaining to a third aspect is the second aspect, wherein the control valve has, in the vehicle width direction, a pair of substantially rectangular cloth members having a longitudinal direction that substantially coincides with the vehicle front-rear direction as seen in a side view, an end portion, on the delay chamber side, of the cloth member on the vehicle width direction inner side is sewn to a base cloth member on the vehicle width direction inner side configuring the delay chamber, an end portion, on the delay chamber side, of the cloth member on the vehicle width direction outer side is sewn to a base cloth member on the vehicle width direction outer side configuring the delay chamber, and end portions, on the main chamber side, of the right and left cloth members are sewn together by the tear seams.

According to the third aspect, the control valve has the pair of the cloth members in the vehicle width direction. The cloth members are each formed in a substantially rectangular shapes having the longitudinal direction that substantially coincides with the vehicle front-rear direction as seen in a side view. The end portion, on the delay chamber side, of the cloth member on the vehicle width direction inner side is sewn to the base cloth member on the vehicle width direction inner side configuring the delay chamber. The end portion, on the delay chamber side, of the cloth member on the vehicle width direction outer side is sewn to the base cloth member on the vehicle width direction outer side configuring the delay chamber. Additionally, the end portions, on the main chamber side, of the right and left cloth members are sewn together by the tear seams. Consequently, during the initial stage of inflation and deployment the gas in the main chamber pushes the end portions on the main chamber side of the right and left cloth members against each other, so the communicating portion is blocked by the right and left cloth members and the flow of the gas from the main chamber to the delay chamber is restricted. During the later stage of inflation and deployment the tear seams tear, so the gas flows to the delay chamber from between the end portions on the main chamber side of the right and left cloth members. Consequently, during the later stage of inflation and deployment the entire curtain airbag is inflated.

A vehicle curtain airbag device pertaining to a fourth aspect is the first aspect, wherein the gas flow control portion includes a welded portion that joins a base cloth member at a vehicle width direction outer side and a base cloth member at a vehicle width direction inner side, which configure the communicating portion, and the joint of the welded portion is undone when the welded portion receives the inflation and deployment pressure of the main chamber during the later stage of inflation and deployment.

According to the fourth aspect, the gas flow control portion includes the welded portion. The welded portion joins the base cloth member at the vehicle width direction outer side and the base cloth member at the vehicle width direction inner side, which configure the communicating portion, and the joint of the welded portion is undone when the welded portion receives the inflation and deployment pressure of the main chamber during the later stage of inflation and deployment. Consequently, during the initial stage of inflation and deployment the flow of the gas from the main chamber to the delay chamber is restricted by the gas flow control portion at which the pair of the base cloth members are joined together, so the gas stays in the main chamber. During the later stage of inflation and deployment the joint of the welded portion is undone and the communicating portion is opened as a result of the inflation and deployment pressure of the main chamber acting on the welded portion, so the gas is allowed to flow from the main chamber to the delay chamber. Consequently, during the later stage of inflation and deployment the entire curtain airbag inflates. The welded portion joins the pair of the base cloth members, which configure the communicating portion, so it can also easily be applied to curtain airbags with complex shapes.

A vehicle curtain airbag device pertaining to a fifth aspect is any of the first aspect to the fourth aspect, wherein plural communicating portions are provided, and the gas flow control portion is provided at least at a communicating portion, out of the plural communicating portions, that is positioned in a vicinity of the inflator.

According to the fifth aspect, the gas flow control portion is provided at least at the communicating portion that is positioned in the vicinity of the inflator, so during the initial stage of inflation and deployment the gas can be restricted from flowing to the delay chamber via the communicating portion in the vicinity of the inflator into which it is easy for the gas from the inflator to flow compared to other parts.

A vehicle curtain airbag device pertaining to a sixth aspect is the first aspect, wherein the delay chamber includes a front delay chamber provided at the vehicle front side of the main chamber and a rear delay chamber provided at the vehicle rear side of the main chamber. Furthermore, the gas flow control portion is provided at least at the communicating portion between the main chamber and the rear delay chamber.

According to the sixth aspect, during the initial stage of the inflation and deployment of the main chamber, the supply of the gas from the main chamber to the front delay chamber and the rear delay chamber is restricted, so the gas stays in the main chamber and the internal pressure of the main chamber can be raised early on. For this reason, the head of the occupant that needs to be restrained during the initial stage of an impact to the vehicle can be efficiently restrained by the main chamber. Furthermore, during the later stage of the inflation and deployment of the main chamber the gas is supplied from the main chamber to the front delay chamber and the rear delay chamber, so the entire curtain airbag, including also the front delay chamber and the rear delay chamber that are not needed for occupant restraint during the initial stage of an impact to the vehicle, can be inflated and deployed.

A vehicle curtain airbag device pertaining to a seventh aspect is the sixth aspect, wherein the front delay chamber is formed so as to inflate and deploy in a substantially cylindrical shape having the longitudinal direction coincides with a vehicle vertical direction and is configured so that a lower end portion of the front delay chamber is positioned at a vehicle lower side of a beltline as seen in a vehicle side view.

According to the seventh aspect, during the later stage of the inflation and deployment of the main chamber, the front delay chamber is inflated and deployed along the torso of the occupant while the lower end portion is supported by a vehicle member on the vehicle lower side of the beltline, so the torso of the occupant during the later stage of the inflation and deployment of the main chamber can be restrained.

A vehicle curtain airbag device pertaining to an eighth aspect is the sixth aspect, wherein the rear delay chamber is formed so as to inflate and deploy in a substantially L-shape having the lower end portion is provided across a range from the vehicle front-rear direction center portion of a center pillar to a rear end portion of a rear side window of a rear side door as seen in a vehicle side view and is configured so that the lower end portion is positioned on the vehicle lower side of the beltline as seen in a vehicle side view.

According to the eighth aspect, during the later stage of the inflation and deployment of the main chamber the rear delay chamber is inflated and deployed along the torso of the occupant while the lower end portion is supported by the vehicle member on the vehicle lower side of the beltline, so the torso of the occupant during the later stage of the inflation and deployment of the main chamber can be restrained.

A vehicle curtain airbag device pertaining to a ninth aspect is the sixth aspect, wherein the main chamber includes a front main chamber provided at the vehicle front side of the rear delay chamber and a rear main chamber provided at the vehicle rear side of the rear delay chamber, and the rear main chamber is connected to the front main chamber via a gas supply passage that extends in the vehicle front-rear direction along an upper edge of the rear delay chamber.

According to the ninth aspect, the head of the occupant in the vehicle rear seat that needs to be restrained during the initial stage of an impact to the vehicle can be appropriately restrained by the rear main chamber.

A vehicle curtain airbag device pertaining to a tenth aspect is the ninth aspect, wherein the rear main chamber is formed so as to inflate and deploy across a range that overlaps with a rear pillar from a vehicle front-rear direction center portion of a rear side window of a rear side door as seen in a vehicle side view.

According to the tenth aspect, during the initial stage of the inflation and deployment of the rear main chamber, the head of the occupant in the rear seat can be appropriated restrained with respect to the rear pillar by the rear main chamber.

The vehicle curtain airbag device pertaining to the first aspect has the superior effect that the internal pressure of the main chamber can be raised early on during the initial stage of inflation and deployment.

The vehicle curtain airbag device pertaining to the second aspect has the superior effect that the inflation timings at the time of the inflation and deployment of the main chamber and the delay chamber can be easily controlled.

The vehicle curtain airbag device pertaining to the third aspect has the superior effect that the internal pressure of the main chamber can be raised early on with a simple configuration.

The vehicle curtain airbag device pertaining to the fourth aspect has the superior effect that it can be adapted to the shapes of various curtain airbags.

The vehicle curtain airbag device pertaining to the fifth aspect has the superior effect that the internal pressure of the main chamber can be raised more efficiently early on.

The vehicle curtain airbag device pertaining to the sixth aspect has the superior effect that the internal pressure of the main chamber can be raised early on during the initial stage of inflation and deployment.

The vehicle curtain airbag device pertaining to the seventh aspect can appropriately restrain the occupant during the later stage of the inflation and deployment of the main chamber.

The vehicle curtain airbag device pertaining to the eighth aspect can appropriately restrain the occupant during the later stage of the inflation and deployment of the main chamber.

The vehicle curtain airbag device pertaining to the ninth aspect can appropriately restrain the head of the occupant in the vehicle rear seat during the initial stage of the inflation and deployment of the main chamber.

The vehicle curtain airbag device pertaining to the tenth aspect can appropriately restrain the head of the occupant in the vehicle rear seat during the initial stage of the inflation and deployment of the main chamber.

BRIEF DESCRIPTION OF THE DRAWINGS

Exemplary embodiments of the present disclosure will be described in detail based on the following figures, wherein.

DETAILED DESCRIPTION

First Embodiment

A first embodiment of a vehicle curtain airbag device pertaining to the disclosure will be described below using FIG. 1 to FIG. 6. It will be noted that arrow FR appropriately shown in these drawings indicates a vehicle forward direction, arrow UP indicates a vehicle upward direction, and arrow OUT indicates an outward direction in a vehicle width direction.

(Overall Configuration)

Figure 1:
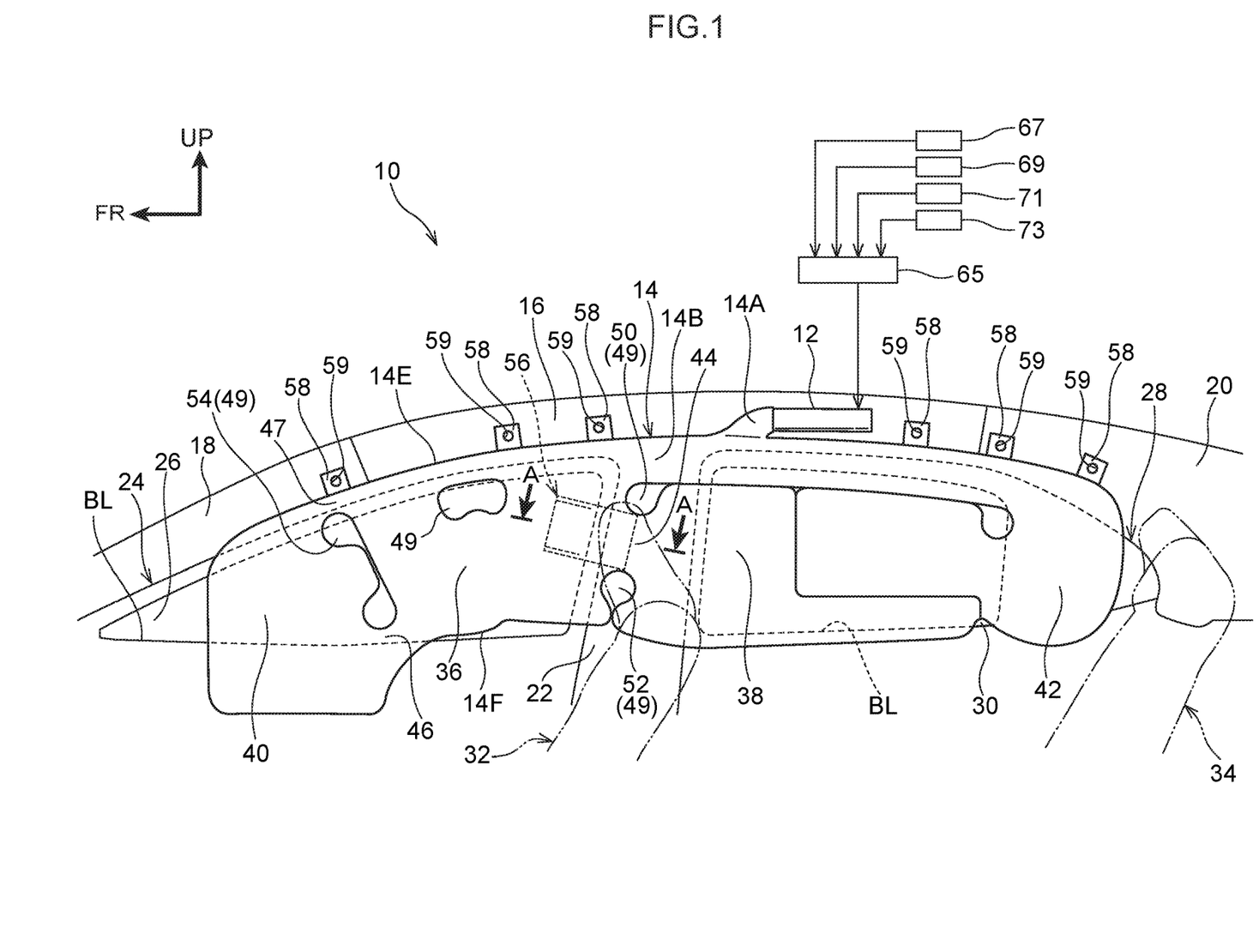
FIG. 1 is a side view showing a vehicle curtain airbag device pertaining to a first embodiment of the disclosure in an inflated and deployed state.

FIG. 1 is a side view showing a vehicle curtain airbag device 10 pertaining to the present embodiment in an activated state as seen from the inside of a cabin. As shown in this drawing, the vehicle curtain airbag device 10 includes an inflator 12, which generates a gas at the time of the vehicle impact, and a curtain airbag 14, which is connected to the inflator 12 and inflates and deploys upon receiving the supply of the gas generated by the inflator 12.

Although it is not shown in the drawings, before being installed in the vehicle, the vehicle curtain airbag device 10 is assembled as a long and narrow member as a result of the curtain airbag 14 being outwardly roll-folded. Then, the vehicle curtain airbag device 10 in this state is stored spanning a space between a roof side rail 16 and a vehicle width direction outer end portion of a ceiling (not shown in the drawings), a space between a front pillar 18 and a front pillar garnish (not shown in the drawings) disposed on the cabin inner side of the front pillar 18, and a space between a rear pillar 20 and a rear pillar garnish (not shown in the drawings) disposed on the cabin inner side of the rear pillar 20.

The inflator 12 is formed in a long and narrow cylindrical shape and, for example, is disposed on the roof side rail 16, on the vehicle upper side in the vicinity of a center pillar 22, in such a way that its axial direction coincides with the vehicle front-rear direction. Plural gas discharge holes (not shown in the drawings) are formed in the outer peripheral portion of the tip of the inflator 12. The inside of the inflator 12 is filled with a gas generating agent, for example, and when the inflator 12 is activated the gas generating agent combusts, a large amount of gas is generated, and the gas is discharged from the gas discharge holes. The inflator 12 with the above configuration is anchored to the roof side rail 16 via brackets (not shown in the drawings). It will be noted that a center pillar garnish (not shown in the drawings) serving as an interior material that covers the center pillar 22 from the cabin inner side is provided at the cabin inner side of the center pillar 22.

(Curtain Airbag)

The curtain airbag 14 is configured as a substantially rectangular bag-like cloth member set to a size capable of substantially covering both a front side window 26 in a front side door 24 for a front seat and a rear side window 30 in a rear side door 28 for a rear seat as seen in a side view when the curtain airbag 14 is inflated and deployed. More specifically, the curtain airbag 14 is equipped with a gas introducing portion 14A, a gas supply passage 14B, a front main chamber 36 serving as a main chamber, a rear main chamber 42 serving as a main chamber, a front delay chamber 40 serving as a delay chamber, and a rear delay chamber 38 serving as a delay chamber.

The gas introducing portion 14A has the tip of the inflator 12 inserted into it. The gas supply passage 14B is continuous with the gas introducing portion 14A and extends linearly in the vehicle forward direction along an upper edge portion 14E of the curtain airbag 14.

The front main chamber 36 corresponds to an area for protecting the head of an occupant (not shown in the drawings) seated in a front seat 32 and is inflated and deployed on the vehicle width direction outer side of the head. Namely, the front main chamber 36 inflates and deploys across a range that overlaps with the center pillar 22 from the vicinity of the vehicle front side of the middle portion of the front side window 26. The front delay chamber 40 is disposed, across a second non-inflating portion 54 described later, on the vehicle front side of the front main chamber 36. Furthermore, the rear delay chamber 38 is disposed, across a first upper non-inflating portion 50 and a first lower non-inflating portion 52 described later, on the vehicle front-rear direction rear side of the front main chamber 36.

The front delay chamber 40 is provided adjacent to the vehicle front-rear direction front side of the front main chamber 36 and is formed so as to inflate in a substantially cylindrical shape having the longitudinal direction coincides with the vehicle vertical direction. Furthermore, the front delay chamber 40 is configured in such a way that the lower end portion is positioned on the vehicle lower side of a beltline BL as seen in a side view. That is, the lower end portion of the front delay chamber 40 comes into abutting contact with a front door trim (not shown in the drawings), which is an interior material provided at the vehicle lower side of the beltline BL, when the front delay chamber 40 is inflated and deployed. It will be noted that the front delay chamber 40 is configured so that its inside communicates with the front main chamber 36 via communicating portions 46, 47. The details of the communicating portions 46, 47 will be described later.

The rear main chamber 42 corresponds to an area for protecting the head of an occupant (not shown in the drawings) seated in a rear seat 34 and is inflated and deployed on the vehicle width direction outer side of the head. Namely, the rear main chamber 42 inflates and deploys across a range that overlaps with the rear pillar 20 from the vicinity of the vehicle front-rear direction center portion of the rear side window 30. The rear delay chamber 38 is disposed, across the first upper non-inflating portion 50, on the vehicle front side of the rear main chamber 42.

The rear delay chamber 38 is provided adjacent to the vehicle rear side of the front main chamber 36 and the vehicle front side of the rear main chamber 42. Namely, the rear delay chamber 38 is formed in a substantially L-shape having a lower end portion is provided across a range from the vehicle front-rear direction center of the center pillar 22 to the vicinity of the rear end portion of the rear side window 30 of the rear side door 28 as seen in a side view when the rear delay chamber 38 is inflated and deployed. The inside of the rear delay chamber 38 is communicated with the front main chamber 36 via a communicating portion 44. The details of the communicating portion 44 will be described later. It will be noted that the lower end portion of the rear delay chamber 38 is configured to be positioned on the vehicle lower side of the beltline BL as seen in a side view. That is, the lower end portion of the rear delay chamber 38 comes into abutting contact with a rear door trim (not shown in the drawings), which is an interior material provided at the vehicle lower side of the beltline BL, when the rear delay chamber 38 is inflated and deployed.

The parts of the curtain airbag 14 to which the gas is supplied will now be described further. The gas introducing portion 14A is formed in the vehicle front-rear direction substantially middle portion of the upper edge portion 14E of the curtain airbag 14. The inflator 12 is connected to the gas introducing portion 14A, whereby the gas generated by the inflator 12 is supplied via the gas introducing portion 14A to the interior of the curtain airbag 14. Furthermore, the gas introducing portion 14A is communicated with the vehicle front-rear direction middle portion of the gas supply passage 14B.

Plural tabs 58 are integrally formed appropriate distances apart from each other on the upper edge portion 14E of the curtain airbag 14. These plural tabs 58 extend in the vehicle upward direction from the upper edge portion 14E of the curtain airbag 14. The tabs 58 are anchored (retained) by fasteners 59 to the roof side rail 16, the front pillar 18, and the rear pillar 20. Moreover, one end portion of a strap-like tension belt (not shown in the drawings) is attached to the front end portion of the curtain airbag 14. The other end portion of the tension belt is anchored by an anchoring bolt (not shown in the drawings) to the front pillar 18.

Portions of the curtain airbag 14 other than the ones described above are non-inflating portions 49 into which the gas does not flow. The non-inflating portions 49 restrict the inflow of the gas as a result of a base cloth member 14C on the vehicle width direction inner side and a base cloth member 14D on the vehicle width direction outer side that configure the curtain airbag 14 (see FIG. 3) being sewn to each other by a looped seam (not shown in the drawings), for example. The non-inflating portions 49 are plurally formed and, for example, have the first upper non-inflating portion 50, the first lower non-inflating portion 52, and the second non-inflating portion 54. The first upper non-inflating portion 50 has a part that extends in the vehicle front-rear direction and a part formed in a substantially L-shape that is provided at the vehicle lower side of that part, and the first upper non-inflating portion 50 is formed in such a way that the vehicle front-side end portion and the vehicle rear-side end portion of the part that extends in the vehicle front-rear direction are substantially circular in shape as seen in a side view. The gas supply passage 14B, the rear delay chamber 38, and the rear main chamber 42 are demarcated by the first upper non-inflating portion 50. It will be noted that the vehicle front-side end portion of the first upper non-inflating portion 50 is provided in a position corresponding to the vehicle front-rear direction substantial center, and the vehicle upper side, of the center pillar 22 as seen in a side view. Furthermore, the vehicle rear-side end portion of the first upper non-inflating portion 50 is provided in a position corresponding to the rear end portion, and the vehicle upper side, of the rear side window 30 as seen in a side view.

The first lower non-inflating portion 52 is provided opposing the vehicle lower side of the vehicle front-side end portion of the part of the first upper non-inflating portion 50 that extends in the vehicle front-rear direction as seen in a side view and is formed in a substantially circular shape that projects in the vehicle upward direction from a lower edge portion 14F of the curtain airbag 14. The communicating portion 44 that intercommunicates the insides of the front main chamber 36 and the rear delay chamber 38 is formed between the first upper non-inflating portion 50 and the first lower non-inflating portion 52.

The second non-inflating portion 54 extends along the substantially vehicle vertical direction between the front main chamber 36 and the front delay chamber 40. The lower end portion of the second non-inflating portion 54 is provided apart from the lower edge portion 14F of the curtain airbag 14, whereby the communicating portion 46 that intercommunicates the insides of the front main chamber 36 and the front delay chamber 40 is formed. Furthermore, the upper end portion of the second non-inflating portion 54 is also provided apart from the upper edge portion 14E of the curtain airbag 14, whereby the communicating portion 47 that intercommunicates the insides of the front main chamber 36 and the front delay chamber 40 is formed. Because of the above configuration, the communicating portion 44 is formed more in the vicinity of the inflator 12 than the other communicating portions 46, 47. It will be noted that the configuration of the non-inflating portion 49 of the curtain airbag 14 other than the first upper non-inflating portion 50, the first lower non-inflating portion 52, and the second non-inflating portion 54 is known by JP-A No. 2016-055824, for example, so detailed description thereof will be omitted.

(Control Valve)

A control valve 56 serving as a gas flow control portion is provided in the communicating portion 44. The control valve 56 is formed in a substantially rectangular shape having the longitudinal direction that substantially coincides with the vehicle front-rear direction as seen in a side view. Specifically, the control valve 56 includes a first cloth member 60, which serves as a rectangular cloth member that extends in a direction inclined in the vehicle downward direction heading in the substantially vehicle rearward direction, and a second cloth member 62, which is provided at the vehicle width direction inner side of the first cloth member 60 and has the same configuration as the first cloth member 60 (see FIG. 2). It will be noted that the first cloth member 60 and the second cloth member 62 are, for example, made of the same material as the base cloth members 14C, 14D of the curtain airbag 14.

Figure 3:
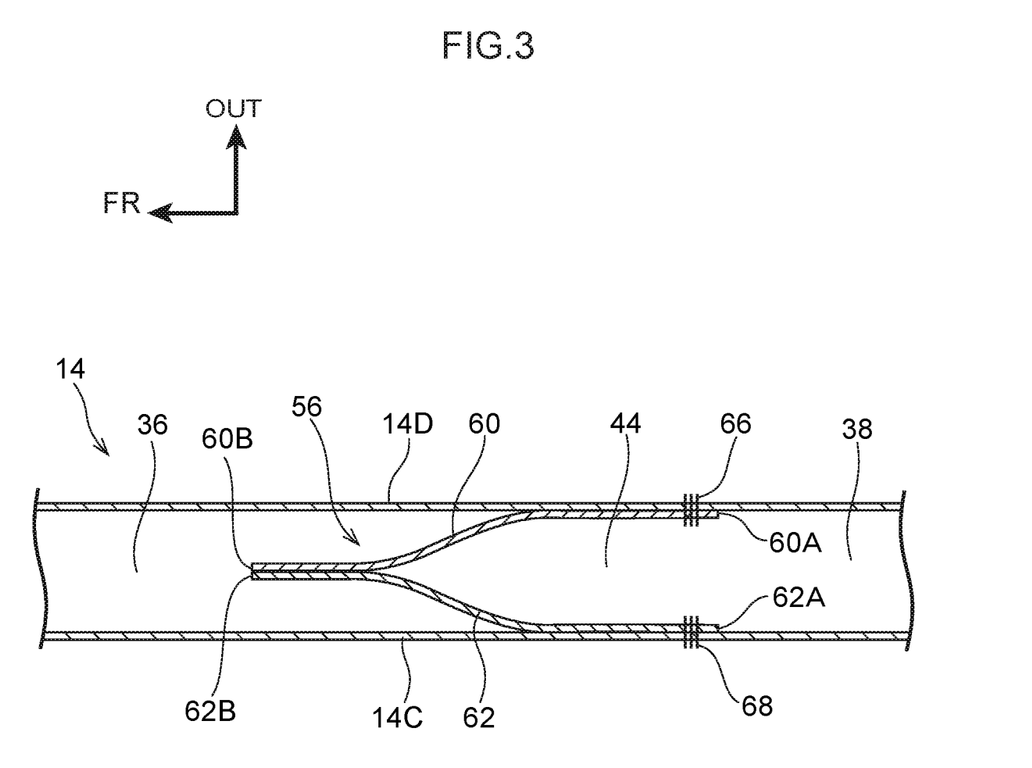
FIG. 3 is an enlarged sectional view showing a cross section, cut along line A-A of FIG. 1, of the vehicle curtain airbag device pertaining to the first embodiment of the disclosure during an initial stage of inflation and deployment.

The vehicle rear-side end portion of the control valve 56 is provided in the part of the communicating portion 44 where the first upper non-inflating portion 50 and the first lower non-inflating portion 52 oppose each other as seen in a side view. Namely, as shown in FIG. 3, an end portion 60A on the vehicle rear side (the rear delay chamber 38 side) of the first cloth member 60 is joined by a seam 66 to the inner surface of the base cloth member 14D on the vehicle width direction outer side of the curtain airbag 14. Likewise, an end portion 62A on the vehicle rear side (the rear delay chamber 38 side) of the second cloth member 62 is joined via a seam 68 to the inner surface of the base cloth member 14C on the vehicle width direction inner side of the curtain airbag 14.

Figure 2:
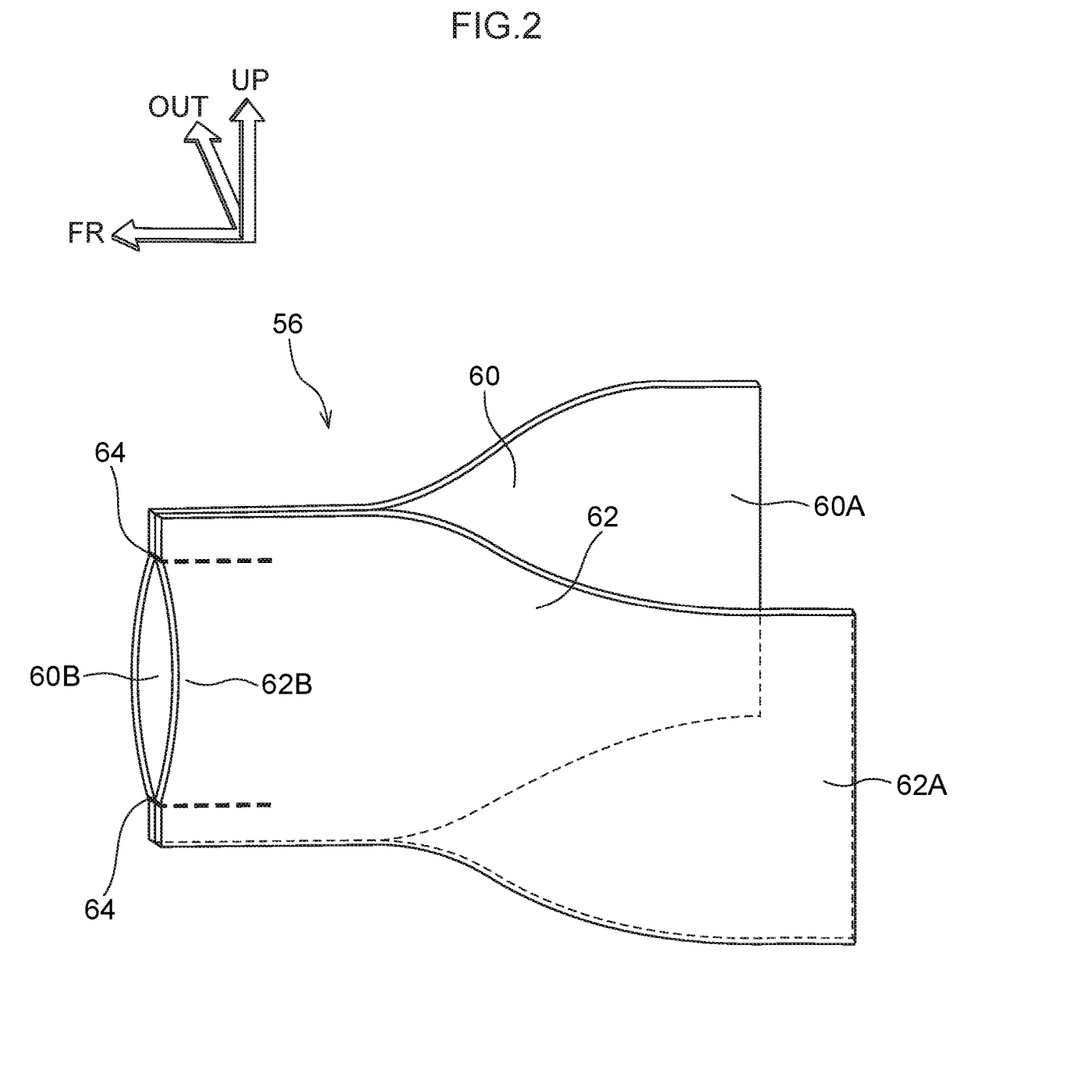
FIG. 2 is a schematic perspective view showing a control valve of the vehicle curtain airbag device pertaining to the first embodiment of the disclosure as seen looking from the inside of a cabin to the outside of the cabin.

It will be noted that the vehicle upper-side end portions of the first cloth member 60 and the second cloth member 62 are joined to each other by a seam not shown in the drawings (see the state of the vehicle front-side end portions in FIG. 2, it will be noted that in FIG. 2, in order to show the configuration of the control valve 56 in a way that is easier to understand, the vehicle upper-side end portions and the vehicle lower-side end portions of the first cloth member 60 and the second cloth member 62 are shown in a state in which they are partially not joined to each other). Likewise, the vehicle lower-side end portions of the first cloth member 60 and the second cloth member 62 are also joined to each other by a seam not shown in the drawings. Because of this, the control valve 56 is formed in a substantially tubular shape by the first cloth member 60 and the second cloth member 62.

The vehicle upper edge portions of the end portion 60A of the first cloth member 60 and the end portion 62A of the second cloth member 62 are joined to the vehicle front-side end portion of the first upper non-inflating portion 50 as seen in a side view (see FIG. 1). Furthermore, the vehicle lower edge portions of the end portion 60A of the first cloth member 60 and the end portion 62A of the second cloth member 62 are joined to the first lower non-inflating portion 52 as seen in a side view (see FIG. 1). Consequently, the insides of the front main chamber 36 and the rear delay chamber 38 are communicated with each other via the inside of the control valve 56.

As shown in FIG. 2, tear seams 64 are provided in the vehicle front-side end portion of the control valve 56. The tear seams 64 are provided in such a way that an end portion 60B on the vehicle front side (the front main chamber 36 side) of the first cloth member 60 and an end portion 62B on the vehicle front side (the front main chamber 36 side) of the second cloth member 62 are sewn together in the substantially vehicle front-rear direction, and the tear seams 64 are provided as a pair apart from each other in the substantially vehicle vertical direction. Because of this, the control valve 56 is normally in a state in which the end portion 60B of the first cloth member 60 and the end portion 62B of the second cloth member 62 are joined together (see FIG. 3, in FIG. 2, in order to show the inside of the control valve 56 in a way that is easier to understand, the parts of the end portion 60B and the end portion 62B between the pair of tear seams 64 are shown in a state in which they are apart from each other).

The curtain airbag 14 and the inflator 12 are provided at both width direction sides of the vehicle. That is, the vehicle curtain airbag device 10 includes a right and left curtain airbags 14 and a right and left inflators 12. It will be noted that the curtain airbag 14 and the inflator 12 on the vehicle left side are not shown in the drawings because they have a configuration that is bilaterally symmetrical to the curtain airbag 14 and the inflator 12 on the vehicle right side.

The activation of the vehicle curtain airbag device 10 described above is controlled by a controller 65 as shown in FIG. 1. Connected to the input side of the controller 65 are a front airbag sensor 67, a small overlap impact detection sensor 69, a side impact detection sensor 71, and a rollover detection sensor 73. The front airbag sensor 67 is disposed in a front side member, for example, and mainly detects a full overlap impact and an offset impact including an oblique impact. Furthermore, the small overlap impact detection sensor 69 is disposed in a portion (e.g., a curved corner portion) of a front bumper reinforcement located on the vehicle width direction outer side of a part that connects to a front side member, for example, and mainly detects a small overlap impact. Moreover, the side impact detection sensor 71 is disposed in the center pillar 22, for example, and mainly detects a side impact. Furthermore, the rollover detection sensor 73 is disposed in the vicinity of the center portion of the vehicle body floor and detects a rollover of the vehicle. Connected to the output side of the controller 65 is, for example, the inflator 12 of the vehicle curtain airbag device 10. The controller 65 activates the inflator 12 when an impact to the vehicle is detected by the front airbag sensor 67, the small overlap impact detection sensor 69, the side impact detection sensor 71, and the rollover detection sensor 73.

Here, an "oblique impact" (MDB impact) is an impact from an oblique frontal direction (e.g., an impact where the relative angle with the impact partner is 15° and the amount of overlap in the vehicle width direction is about 35%) defined, for example, by the U.S. National Highway Traffic Safety Administration (NHTSA). In this embodiment, for example, an oblique impact at a relative velocity of 90 km/hr is supposed. Furthermore, a "small overlap impact" is a type of frontal impact to an automobile where the amount of overlap in the vehicle width direction with the impact partner as defined by the U.S. Insurance Institute for Highway Safety (IIHS), for example, is 25% or less. For example, an impact to the vehicle width direction outer side of a front side member that is a vehicle body frame corresponds to a small overlap impact. In this embodiment, for example, a small overlap impact at a relative velocity of 64 km/hr is supposed.

Action and Effects of First Embodiment

Next, the action and effects of the first embodiment will be described.

In the present embodiment, as shown in FIG. 1, the vehicle curtain airbag device 10 has the front main chamber 36, the rear delay chamber 38, and the control valve 56. The front main chamber 36 is inflated and deployed in the vehicle downward direction from the vehicle width direction outer end portion of the ceiling as a result of the inflator 12 being activated and the gas being supplied to the interior of the front main chamber 36 at the time of the vehicle impact. The rear delay chamber 38 is provided at a rear side of the front main chamber 36 in the vehicle front-rear direction and is inflated and deployed by the gas supplied from the front main chamber 36 via the communicating portion 44. The control valve 56 is provided in the communicating portion 44 and restricts the supply of the gas from the front main chamber 36 to the rear delay chamber 33 during the initial stage of the inflation and deployment of the front main chamber 36. The control valve 56 releases restriction of the supply of the gas from the front main chamber 36 to the rear delay chamber 38 during the later stage of the inflation and deployment of the front main chamber 36. Consequently, during the initial stage of the inflation and deployment of the front main chamber 36 the supply of the gas from the front main chamber 36 to the rear delay chamber 38 is restricted, so the gas stays in the front main chamber 36 and the internal pressure of the front main chamber 36 can be raised early on. For this reason, the head of the occupant that needs to be restrained during the initial stage of an impact to the vehicle can be efficiently restrained by the front main chamber 36. Furthermore, during the later stage of the inflation and deployment of the front main chamber 36 the gas is supplied from the front main chamber 36 to the rear delay chamber 38, so the entire curtain airbag 14, including also the rear delay chamber 38 that is not needed for occupant restraint during the initial stage of an impact to the vehicle, can be inflated and deployed. Because of this, in the initial state of inflation and deployment the internal pressure of the front main chamber 36 can be raised early on.

Figure 4:
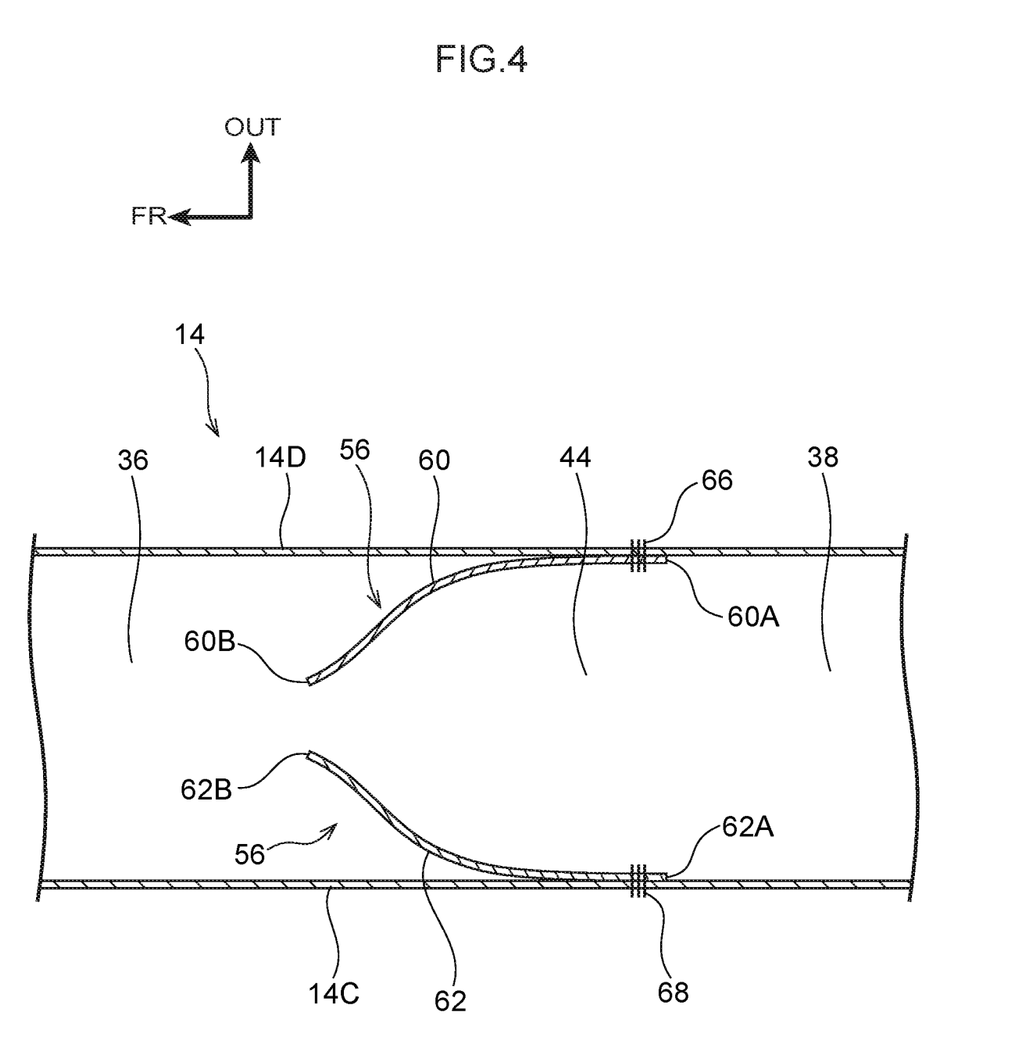
FIG. 4 is an enlarged sectional view showing a later stage of inflation and deployment with respect to FIG. 3.

Furthermore, in the control valve 56, as shown in FIG. 2, part of the flow passage through which the gas flows is sewn by the tear seams 64 that tear when they receive the inflation and deployment pressure of the front main chamber 36 during the later stage of inflation and deployment. Consequently, as shown in FIG. 4, during the initial stage of inflation and deployment the front main chamber 36 is filled with the gas from the inflator 12, and as shown in FIG. 4, during the later stage of inflation and deployment the tear seams 64 tear and the gas flows from the front main chamber 36 to the rear delay chamber 38. For this reason, during the initial stage of inflation and deployment the internal pressure of the front main chamber 36 can be raised early on. Furthermore, the tear timing of the tear seams 64 can be adjusted by changing the thread strength and sewing length of the tear seams 64, so the difference in the inflation times of the front main chamber 36 and the rear delay chamber 38 can be easily changed. Because of this, the inflation timings at the time of the inflation and deployment of the front main chamber 36 and the rear delay chamber 38 can be easily controlled.

Moreover, the control valve 56 has the first cloth member 60 and the second cloth member 62 that are provided as a pair in the vehicle width direction. The first cloth member 60 and the second cloth member 62 are each formed in a substantially rectangular shape having the longitudinal direction that substantially coincides with the vehicle front-rear direction as seen in a side view (see FIG. 2). The end portion 62A of the second cloth member 62 provided at the vehicle width direction inner side is sewn to the base cloth member 14C on the vehicle width direction inner side configuring the rear delay chamber 38. The end portion 60A of the first cloth member 60 on the vehicle width direction outer side is sewn to the base cloth member 14D on the vehicle width direction outer side configuring the rear delay chamber 38. Additionally, the end portions 60B, 62B, on the front main chamber 36 side, of the first cloth member 60 and the second cloth member 62 are sewn together by the tear seams 64 (see FIG. 2). Consequently, as shown in FIG. 3, during the initial stage of inflation and deployment the gas inside the front main chamber 36 pushes the end portions 60B, 62B on the front main chamber 36 side of the right and left first cloth member 60 and the second cloth member 62 against each other, so the communicating portion 44 is blocked by the right and left first cloth member 60 and the second cloth member 62, and the flow of the gas from the front main chamber 36 to the rear delay chamber 38 is restricted. During the later stage of inflation and deployment the tear seams 64 tear, so as shown in FIG. 4 the gas flows to the rear delay chamber 38 from between the end portions 60B, 628 on the front main chamber 36 side of the right and left first cloth member 60 and the second cloth member 62. Consequently, during the later stage of inflation and deployment the entire curtain airbag 14 is inflated. Because of this, the internal pressure of the front main chamber 36 can be raised early on with a simple configuration.

Moreover still, as shown in FIG. 1, the control valve 56 is provided in the communicating portion 44, out of the plural communicating portions 44, 46, 47, that is positioned in the vicinity of the inflator 12, so during the initial stage of inflation and deployment the gas can be restricted from flowing to the rear delay chamber 38 via the communicating portion 44 in the vicinity of the inflator 12 into which it is easy for the gas from the inflator 12 to flow compared to other parts. Because of this, the internal pressure of the front main chamber 36 can be raised more efficiently early on.

Figure 5:
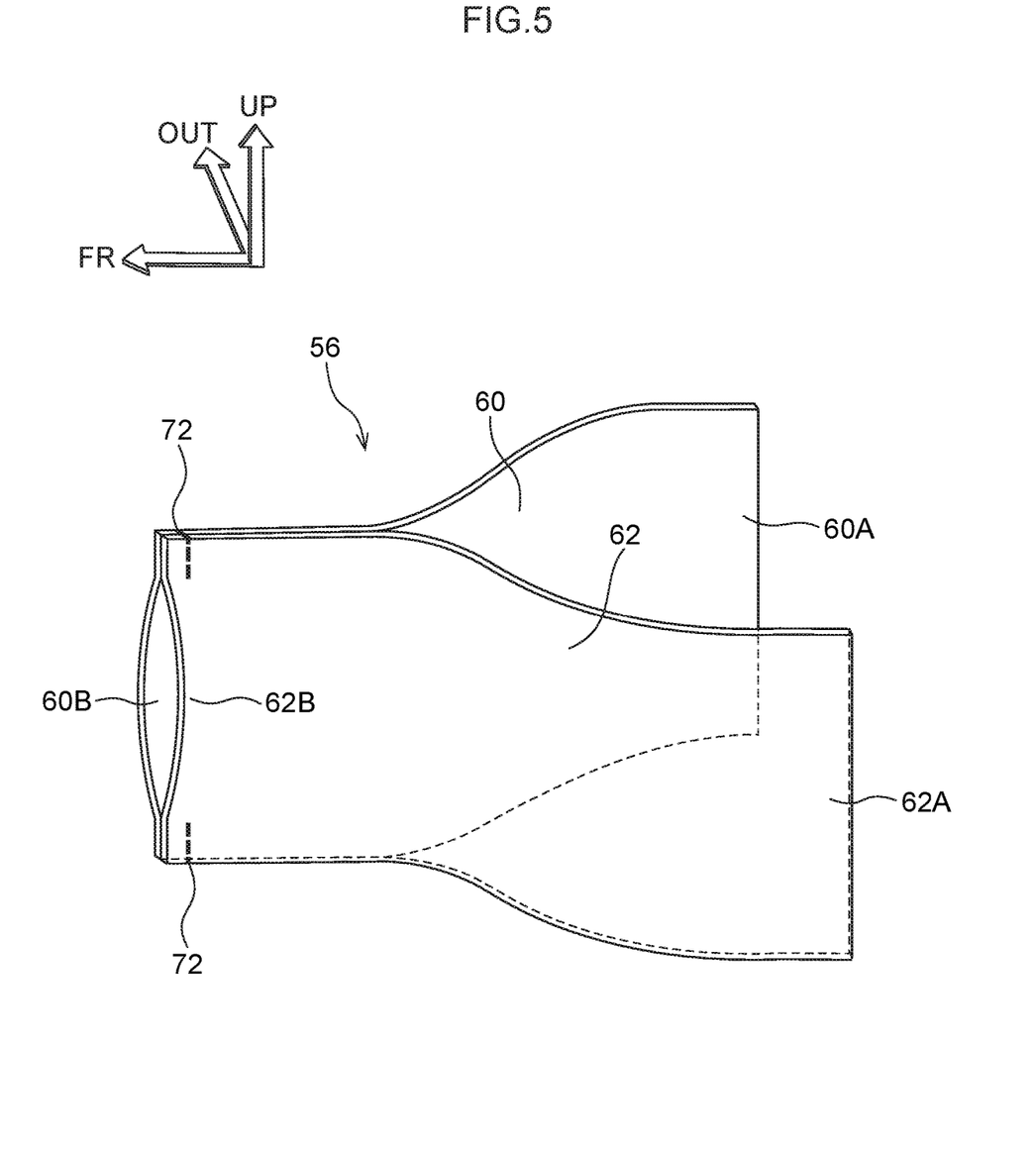
FIG. 5 is a schematic perspective view, corresponding to FIG. 2, showing a first example modification of the vehicle curtain airbag device pertaining to the first embodiment of the disclosure.
Figure 6:
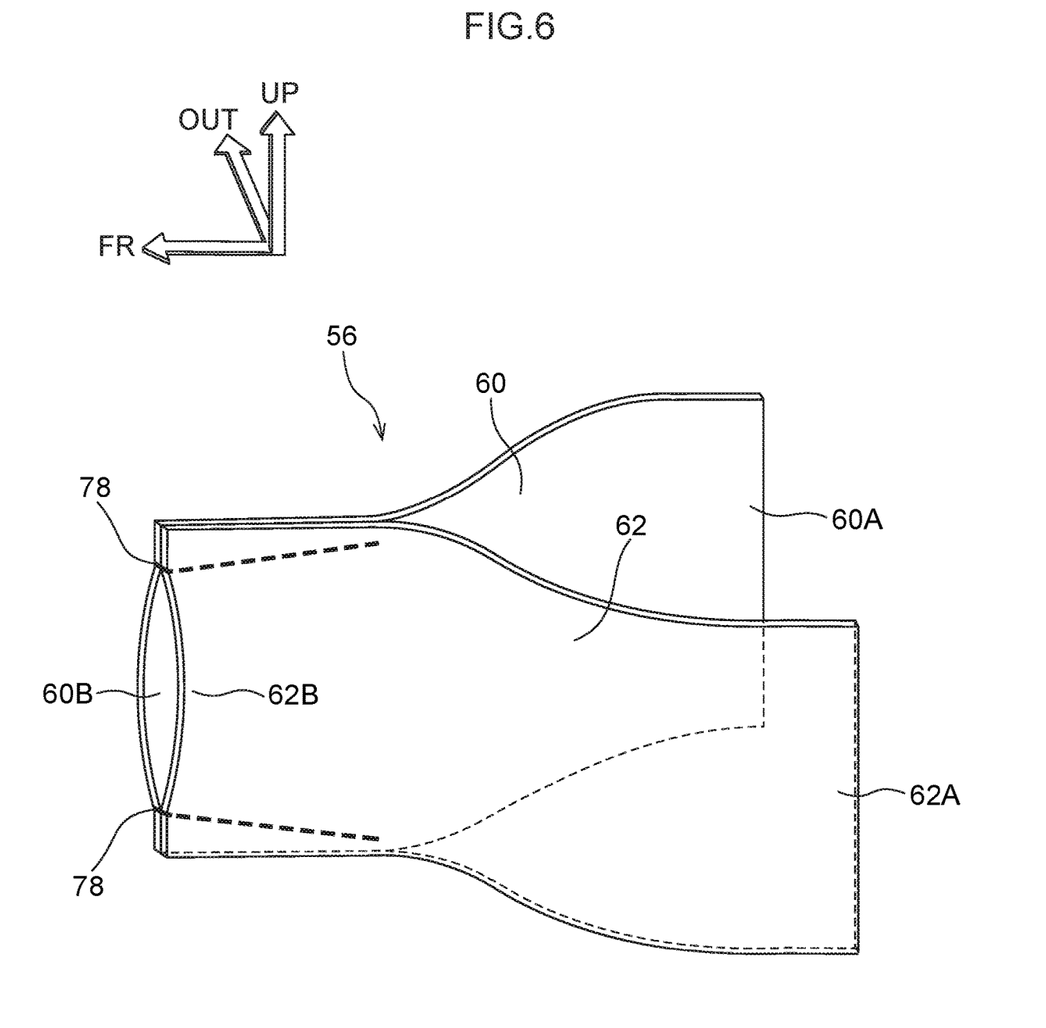
FIG. 6 is a schematic perspective view, corresponding to FIG. 2, showing a second example modification of the vehicle curtain airbag device pertaining to the first embodiment of the disclosure.

It will be noted that although in the present embodiment the control valve 56 is provided with the tear seams 64 that extend in the substantially vehicle front-rear direction as shown in FIG. 2, the control valve 56 is not limited to this and may also be provided with tear seams 72 that extend in the substantially vehicle vertical direction as shown in FIG. 5. Furthermore, as shown in FIG. 6, the control valve 56 may also be provided with a pair of tear seams 78 that are inclined in directions in which the distance between them increases heading in the vehicle rearward direction. Moreover, although it is not shown in the drawings, the pair of tear seams 78 may also be inclined in directions in which the distance between them decreases heading in the vehicle rearward direction. Moreover still, although it is not shown in the drawings, the control valve 56 may also have a configuration where a tear seam is provided in the vehicle vertical direction substantial center of the end portion 60B of the first cloth member 60 and the end portion 62B of the second cloth member 62, or may have a configuration other than this. Because of this, the strength with which the end portion 60B of the first cloth member 60 and the end portion 62B of the second cloth member 62 are sewn together by the tear seams 64, 72, 78 can be appropriately adjusted, so the curtain airbag 14 can be inflated and deployed at an appropriate timing in accordance with the vehicle.

Second Embodiment

Next, a vehicle curtain airbag device pertaining to a second embodiment of the disclosure will be described using FIG. 7. It will be noted in regard to constituent parts that are the same as those in the first embodiment and its example modifications that the same numbers are assigned thereto and description thereof will be omitted.

A vehicle curtain airbag device 80 pertaining to the second embodiment has the same basic configuration as the vehicle curtain airbag device 10 of the first embodiment but is characterized in that the gas flow control portion is a welded portion 82.

Figure 7:
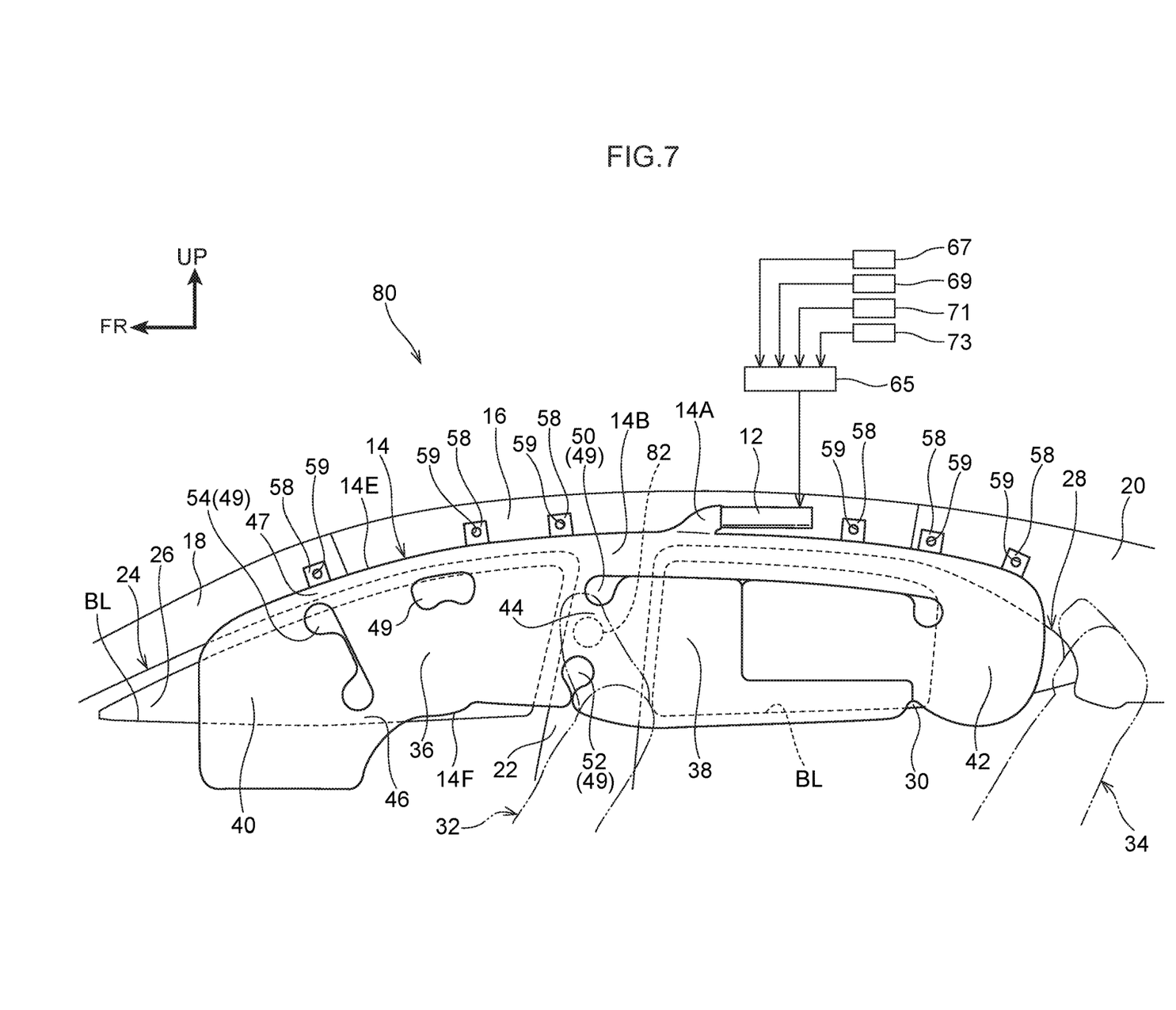
FIG. 7 is a side view showing a vehicle curtain airbag device pertaining to a second embodiment of the disclosure in an inflated and deployed state.

Namely, as shown in FIG. 7, the welded portion 82 is provided in the communicating portion 44. The welded portion 82 welds together the base cloth member 14C and the base cloth member 14D (see FIG. 3) of the curtain airbag 14 in the vehicle width direction. The welded portion 82 is formed in a circular shape, as seen in a side view, in a position between the first upper non-inflating portion 50 and the first lower non-inflating portion 52 in the communicating portion 44. It will be noted that the welding strength of the welded portion 82 is set in such a way that the joint is undone when the inflation and deployment pressure of the front main chamber 36 during the later stage of the inflation and deployment of the curtain airbag 14 acts on the communicating portion 44. It will be noted that although in the present embodiment there is just one welded portion 82, the number of welded portions 82 is not limited to this, and more than one may also be provided.

Action and Effects of Second Embodiment

Next, the action and effects of the second embodiment will be described.

According to the above configuration also, the same effects as those of the first embodiment are obtained because the vehicle curtain airbag device 80 is configured in the same way as the vehicle curtain airbag device 10 of the first embodiment except that the welded portion 82 serves as the gas flow control portion. Furthermore, the gas flow control portion includes the welded portion 82. The welded portion 82 joins the base cloth member 14D at the vehicle width direction outer side and the base cloth member 14C at the vehicle width direction inner side, which configure the communicating portion 44, and the joint of the welded portion 82 is undone when the welded portion 82 receives the inflation and deployment pressure of the front main chamber 36 during the later stage of inflation and deployment. Consequently, during the initial stage of inflation and deployment the flow of the gas from the front main chamber 36 to the rear delay chamber 38 is restricted by the welded portion 82 at which the pair of the base cloth members 14C, 14D are joined together, so the gas stays mainly in the front main chamber 36. During the later stage of inflation and deployment the joint of the welded portion 82 is undone and the communicating portion 44 is opened as a result of the inflation and deployment pressure of the front main chamber 36 acting on the welded portion 82, so the gas is allowed to flow from the front main chamber 36 to the rear delay chamber 38. Consequently, during the later stage of inflation and deployment the entire curtain airbag 14 inflates. The welded portion 82 joins the pair of the base cloth members 14C, 14D, which configure the communicating portion 44, so it can also be easily applied to curtain airbags 14 with complex shapes and curtain airbags that are double-woven into a tubular shape integrally by the one-piece woven (OPW) technique. Because of this, the welded portion 82 can be adapted to the shapes of various curtain airbags 14.

It will be noted that although in the first and second embodiments described above the control valve 56 or the welded portion 82 is provided in the communicating portion 44 of the curtain airbag 14, the control valve 56 and the welded portion 82 are not limited to this and may also be provided in at least one of the communicating portions 46, 47.

Furthermore, the welded portion 82 welds together the base cloth member 14C and the base cloth member 14D of the curtain airbag 14 in the vehicle width direction, but the welded portion 82 may also join together the base cloth member 14C and the base cloth member 14D in the vehicle width direction at the tear seams 64, 72, 78.

Embodiments of the disclosure have been described above, but the disclosure is not limited to what is described above and can of course be modified and implemented in a variety of ways, in addition to what is described above, in a range that does not depart from the spirit thereof.

What is claimed is:

1. A vehicle curtain airbag device comprising:
   a main chamber that is inflated and deployed in a vehicle downward direction from a vehicle width direction outer end portion of a ceiling, due to an inflator being activated and gas being supplied to an interior of the main chamber at a time of a vehicle impact;
   a delay chamber that is provided at at least one side of the main chamber in a vehicle front-rear direction and is inflated and deployed by gas supplied from the main chamber via a communicating portion; and
   a gas flow control portion that is provided at the communicating portion, restricts supply of the gas from the main chamber to the delay chamber during an initial stage of inflation and deployment of the main chamber, and releases restriction of the supply of the gas from the main chamber to the delay chamber during a later stage of the inflation and deployment of the main chamber, wherein:
the delay chamber includes a front delay chamber provided at a vehicle front side of the main chamber and a rear delay chamber provided at a vehicle rear side of the main chamber; and
the gas flow control portion is provided at least at a communicating portion between the main chamber and the rear delay chamber.

2. The vehicle curtain airbag device according to claim 1, wherein the gas flow control portion is configured by a control valve in which part of a flow passage through which gas flows is sewn by tear seams that tear when they receive inflation and deployment pressure of the main chamber during the later stage of inflation and deployment.

3. The vehicle curtain airbag device according to claim 2, wherein:
the control valve has, in the vehicle width direction, a pair of substantially rectangular cloth members having a longitudinal direction that substantially coincides with the vehicle front-rear direction as seen in a side view,
an end portion, at a delay chamber side, of the cloth member at a vehicle width direction inner side is sewn to a base cloth member at the vehicle width direction inner side, the base cloth member configuring the delay chamber,
an end portion, at the delay chamber side, of the cloth member at a vehicle width direction outer side is sewn to a base cloth member at the vehicle width direction outer side, the base cloth member configuring the delay chamber, and
end portions, at a main chamber side, of the pair of cloth members are sewn together by the tear seams.

4. The vehicle curtain airbag device according to claim 3, wherein the end portions at the main chamber side of the pair of cloth members are sewn together by the pair of tear seams extending in a substantially vehicle front-rear direction.

5. The vehicle curtain airbag device according to claim 3, wherein the end portions at the main chamber side of the pair of cloth members are sewn together by the pair of tear seams extending in a substantially vehicle vertical direction.

6. The vehicle curtain airbag device according to claim 3, wherein the end portions at the main chamber side of the pair of cloth members are sewn together by the pair of tear seams that are inclined in directions in which the distance between the pair of tear seams increases heading in a vehicle rearward direction.

7. The vehicle curtain airbag device according to claim 1, wherein:
the gas flow control portion includes a welded portion that joins a base cloth member at a vehicle width direction outer side and a base cloth member at a vehicle width direction inner side, which configure the communicating portion, and
a joint of the welded portion is undone when the welded portion receives inflation and deployment pressure of the main chamber during the later stage of inflation and deployment.

8. The vehicle curtain airbag device according to claim 1, wherein:
a plurality of communicating portions are provided, and the gas flow control portion is provided at least at a communicating portion, of the plurality of communicating portions, that is positioned in a vicinity of the inflator.

9. The vehicle curtain airbag device according to claim 1, wherein the front delay chamber is formed so as to inflate and deploy in a substantially cylindrical shape having a longitudinal direction that coincides with a vehicle vertical direction and the front delay chamber is configured so that a lower end portion of the front delay chamber is positioned at a vehicle lower side of a beltline as seen in a vehicle side view.

10. The vehicle curtain airbag device according to claim 1, wherein the rear delay chamber is formed so as to inflate and deploy in a substantially L-shape having a lower end portion that is provided across a range from a vehicle front-rear direction center portion of a center pillar to a rear end portion of a rear side window of a rear side door, as seen in a vehicle side view, and the rear delay chamber is configured so that a lower end portion of the rear delay chamber is positioned at a vehicle lower side of a beltline as seen in vehicle side view.

11. The vehicle curtain airbag device according to claim 1, wherein
the main chamber includes a front main chamber provided at a vehicle front side of the rear delay chamber and a rear main chamber provided at a vehicle rear side of the rear delay chamber, and
the rear main chamber is connected to the front main chamber via a gas supply passage that extends in the vehicle front-rear direction along an upper edge of the rear delay chamber.

12. The vehicle curtain airbag device according to claim 11, wherein the rear main chamber is formed so as to inflate and deploy across a range that overlaps with a rear pillar from a vehicle front-rear direction center portion of a rear side window of a rear side door as seen in a vehicle side view.

13. A vehicle curtain airbag device comprising:
a main chamber that is inflated and deployed in a vehicle downward direction from a vehicle width direction outer end portion of a ceiling, due to an inflator being activated and gas being supplied to an interior of the main chamber at a time of a vehicle impact;
a delay chamber that is provided at at least one side of the main chamber in a vehicle front-rear direction and is inflated and deployed by gas supplied from the main chamber via a communicating portion; and
a gas flow control portion that is provided at the communicating portion, restricts supply of the gas from the main chamber to the delay chamber during an initial stage of inflation and deployment of the main chamber, and releases restriction of the supply of the gas from the main chamber to the delay chamber during a later stage of the inflation and deployment of the main chamber, wherein:
the gas flow control portion is configured by a control valve in which part of a flow passage through which gas flows is sewn by tear seams that tear when they receive inflation and deployment pressure of the main chamber during the later stage of inflation and deployment,
the control valve has, in the vehicle width direction, a pair of substantially rectangular cloth members having a longitudinal direction that substantially coincides with the vehicle front-rear direction as seen in a side view,
an end portion, at a delay chamber side, of the cloth member at a vehicle width direction inner side is sewn to a base cloth member at the vehicle width direction inner side, the base cloth member configuring the delay chamber, an end portion, at the delay chamber side, of the cloth member at a vehicle width direction outer side is sewn to a base cloth member at the vehicle width direction outer side, the base cloth member configuring the delay chamber, and end portions, at a main chamber side, of the pair of cloth members are sewn together by the tear seams.

14. The vehicle curtain airbag device according to claim 13, wherein:

a plurality of communicating portions are provided, and the gas flow control portion is provided at least at a communicating portion, of the plurality of communicating portions, that is positioned in a vicinity of the inflator.

15. The vehicle curtain airbag device according to claim 13, wherein the end portions at the main chamber side of the pair of cloth members are sewn together by the pair of tear seams extending in a substantially vehicle front-rear direction.

16. The vehicle curtain airbag device according to claim 13, wherein the end portions at the main chamber side of the pair of cloth members are sewn together by the pair of tear seams extending in a substantially vehicle vertical direction.

17. The vehicle curtain airbag device according to claim 13, wherein the end portions at the main chamber side of the pair of cloth members are sewn together by the pair of tear seams that are inclined in directions in which the distance between the pair of tear seams increases heading in a vehicle rearward direction.

* * * * *